United States Patent
Kekki et al.

(10) Patent No.: US 10,201,029 B2
(45) Date of Patent: Feb. 5, 2019

(54) ACCESS MANAGEMENT WITH MULTIPATH TRANSPORT

(71) Applicant: Nokia Technologies Oy, Espoo (FI)

(72) Inventors: Sami Johannes Kekki, Helsinki (FI); Mika Petri Olavi Rinne, Espoo (FI)

(73) Assignee: Nokia Technologies Oy, Espoo (FI)

( * ) Notice: Subject to any disclaimer, the term of this patent is extended or adjusted under 35 U.S.C. 154(b) by 23 days.

(21) Appl. No.: 15/301,461

(22) PCT Filed: Apr. 4, 2014

(86) PCT No.: PCT/IB2014/060439
§ 371 (c)(1),
(2) Date: Oct. 3, 2016

(87) PCT Pub. No.: WO2015/150875
PCT Pub. Date: Oct. 8, 2015

(65) Prior Publication Data
US 2017/0118787 A1    Apr. 27, 2017

(51) Int. Cl.
*H04W 76/15* (2018.01)
*H04L 29/06* (2006.01)
(Continued)

(52) U.S. Cl.
CPC ............ *H04W 76/15* (2018.02); *H04L 69/14* (2013.01); *H04L 69/163* (2013.01);
(Continued)

(58) Field of Classification Search
None
See application file for complete search history.

(56) References Cited

U.S. PATENT DOCUMENTS

2012/0099601 A1*  4/2012  Haddad ............ H04L 29/12405
                                                          370/401
2012/0188949 A1    7/2012  Droste
(Continued)

OTHER PUBLICATIONS

International Search Report and Written Opinion received for corresponding Patent Cooperation Treaty Application No. PCT/IB2014/060439, dated May 6, 2015, 17 pages.
(Continued)

*Primary Examiner* — Otis L Thompson, Jr.
(74) *Attorney, Agent, or Firm* — Mintz Levin Cohn Ferris Glovsky and Popeo, P.C.

(57) ABSTRACT

A method including transmitting from, a node a request for a packet data network (PDN) connection; and indicating by the node that the PDN connection request is for a multipath transmission control protocol (MPTCP) use. A method including receiving a request by a node for a second packet data network (PDN) connection, where the node has a first packet data network (PDN) connection; and accepting the request for the second packet data network (PDN) connection based, at least partially, upon the node indicating that the second PDN connection request is for a multipath transmission control protocol (MPTCP) use. A method including selecting a second gateway for the second packet data network (PDN) connection based, at least partially, upon a determination that the request is for the multipath transmission control protocol (MPTCP) use, where the selecting of the second gateway avoids selection of the first gateway as the second gateway.

15 Claims, 9 Drawing Sheets

(51) Int. Cl.
*H04W 76/16* (2018.01)
*H04L 12/707* (2013.01)
*H04W 48/02* (2009.01)
*H04W 48/00* (2009.01)
*H04W 88/16* (2009.01)

(52) U.S. Cl.
CPC ............. *H04W 76/16* (2018.02); *H04L 45/24* (2013.01); *H04W 48/02* (2013.01); *H04W 48/17* (2013.01); *H04W 88/16* (2013.01)

(56) References Cited

U.S. PATENT DOCUMENTS

| | | |
|---|---|---|
| 2014/0078986 A1 | 3/2014 | Kaippallimalil |
| 2014/0169330 A1* | 6/2014 | Rommer ............... H04W 36/08 370/331 |
| 2015/0312383 A1* | 10/2015 | Roeland ................ H04L 69/18 370/331 |
| 2015/0319270 A1* | 11/2015 | Roeland .............. H04L 61/2007 370/254 |
| 2016/0037428 A1* | 2/2016 | Kanugovi ............... H04L 69/16 370/329 |
| 2016/0309534 A1* | 10/2016 | Teyeb ..................... H04L 69/14 |

OTHER PUBLICATIONS

Sing Chung Nguyen et al, "Evaluation of Multipath TCP Load Sharing with Coupled Congestion Control Option in Heterogeneous Networks", Global Information Infrastructure Symposium, 2011, IEEE, Aug. 4, 2011, XP031940925.

Kellokoski Jari, "Real-Life Multipath TCP Based Make-Before-Break Vertical Handover", 2013 IEEE Symposium on Computers and Communications, IEEE, Jul. 7, 2013, pp. 252-256.

NTT Docomo, et al., "Update to UE Requested PDN Connectivity" 3GPP Draft, S2-084169 S2-083798, 3rd Generation Partnership Project (3GPP), vol. SA WG2, no Parague May 14, 2008, May 14, 2008.

* cited by examiner

ACCESS MANAGEMENT WITH MULTIPATH TRANSPORT

RELATED APPLICATION

This application was originally filed as Patent Cooperation Treaty Application No. PCT/IB2014/060439 filed Apr. 4, 2014

BACKGROUND

Technical Field

The exemplary and non-limiting embodiments relate generally to radio access communication and, more particularly, to communication using multiple paths at a same time.

Brief Description of Prior Developments

The following abbreviations that may be found in the specification and/or the drawing figures are defined as follows:

3GPP—Third Generation Partnership Project
AAA—Authentication, Authorization, Accounting
ANDSF—Access Network Discovery and Selection Function
APN—Access Point Name (e.g. Elisa Internet)
CN—Core Network
DHCP—Dynamic Host Configuration Protocol
eNB—Evolved NodeB (base station)
ePDG—enhanced/evolved Packet Data Gateway
EPC—Evolved Packed Core
IETF—Internet Engineering Task Force
IARP—Inter-APN Routing Policy
IMS—IP Multimedia subsystem; network architecture and functionality to deliver IP multimedia services.
IP—Internet Protocol
ISMP—Inter-System Mobility Policy (not applicable with MPTCP)
ISRP—Inter-System Routing Policy
MCG—Master Cell Group of dual connectivity
MME—Mobility Management Entity
MNO—Mobile Network Operator
MO—Management Object
MPTCP—Multipath TCP i.e. TCP protocol using multiple transmission paths over multiple IP addresses
NAS—Network Access Server
NAS—non-Access-Stratum (such as Connection management protocol for example)
P-GW—PDN Gateway
PDN—Public Data Network, Packet Data Network
RAN—Radio Access Network
RAT—Radio Access Technology
SCG—Secondary Cell Group of dual connectivity
SGW—gateway, a serving gateway
SSID—Service Set Identifier
TCP—Transmission Control Protocol
UE—User Equipment
WLAN—Wireless Local Area Network (a.k.a. Wi-Fi)
WLANSP—WLAN Selection Policy
WLCP—WLAN Control Protocol MPTCP is defined by the Internet Engineering Task Force (IETF) for a generic Transmission Control Protocol (TCP) level mechanism that works over multiple Internet Protocol (IP) interfaces to improve throughput and robustness. MPTCP does not limit, nor guide, the use of radio access networks (RANs) for MPTCP purposes. The use of multiple radio access networks (RANs) simultaneously is a functionality which requires operational policies and, therefore, Third Generation Partnership Project (3GPP) has specified a management object (MO) to assist the User Equipment (UE) operation in this architecture. 3GPP has not worked on MPTCP related aspects, but has assumed that the MPTCP sessions are transparent to the 3GPP system. Conventional management objects (MOs) do not include any definitions for the MPTCP use.

SUMMARY

The following summary is merely intended to be exemplary. The summary is not intended to limit the scope of the claims.

In accordance with one aspect, an example method comprises transmitting from a node a request for a packet data network (PDN) connection; and indicating by the node that the PDN connection request is for a multipath transmission control protocol (MPTCP) use.

In accordance with another aspect, an example embodiment is provided in an apparatus comprising at least one processor; and at least one non-transitory memory including computer program code, the at least one memory and the computer program code configured to, with the at least one processor, cause the apparatus at least to: transmit from the apparatus a request for a packet data network (PDN) connection; and indicate by the apparatus that the PDN connection request is for a multipath transmission control protocol (MPTCP) use.

In accordance with another aspect, an example embodiment is provided in a non-transitory program storage device readable by a machine, tangibly embodying a program of instructions executable by the machine for performing operations, the operations comprising: transmitting from a node a request for a packet data network (PDN) connection; and indicating by the node that the PDN connection request is for a multipath transmission control protocol (MPTCP) use.

In accordance with another aspect, an example embodiment is provided in an apparatus comprising means for transmitting from a node a request for a packet data network (PDN) connection; and means for indicating by the node that the PDN connection request is for a multipath transmission control protocol (MPTCP) use.

In accordance with another aspect, an example method comprises receiving a request by a node for a second packet data network (PDN) connection, where the node has a first packet data network (PDN) connection; and accepting the request for the second packet data network (PDN) connection based, at least partially, upon the node indicating that the second PDN connection request is for a multipath transmission control protocol (MPTCP) use.

In accordance with another aspect, an example embodiment is provided in an apparatus comprising at least one processor; and at least one non-transitory memory including computer program code, the at least one memory and the computer program code configured to, with the at least one processor, cause the apparatus at least to: determine if a node has a first packet data network (PDN) connection; and accept a request by the node for a second packet data network (PDN) connection based, at least partially, upon the node receipt of an indication that the second PDN connection request is for a multipath transmission control protocol (MPTCP) use.

In accordance with another aspect, an example embodiment is provided in a non-transitory program storage device readable by a machine, tangibly embodying a program of instructions executable by the machine for performing operations, the operations comprising: determining if a node has a first packet data network (PDN) connection; and accepting a request by the node for a second packet data network (PDN) connection based, at least partially, upon receipt of an indication that the second PDN connection request is for a multipath transmission control protocol (MPTCP) use.

In accordance with another aspect, an example embodiment is provided in an apparatus comprising means for determining if a node has a first packet data network (PDN) connection; and means for accepting a request by the node for a second packet data network (PDN) connection based, at least partially, upon receipt of an indication that the second PDN connection request is for a multipath transmission control protocol (MPTCP) use.

In accordance with another aspect, an example method comprises determining if a request by a node for a second packet data network (PDN) connection is for a multipath transmission control protocol (MPTCP) use, where the node has a first packet data network (PDN) connection through a first gateway; and selecting a second gateway for the second packet data network (PDN) connection based, at least partially, upon a determination that the request is for the multipath transmission control protocol (MPTCP) use, where the selecting of the second gateway avoids selection of the first gateway as the second gateway.

In accordance with another aspect, an example embodiment is provided in an apparatus comprising at least one processor; and at least one non-transitory memory including computer program code, the at least one memory and the computer program code configured to, with the at least one processor, cause the apparatus at least to: determine if a request by a node for a second packet data network (PDN) connection is for a multipath transmission control protocol (MPTCP) use, where the node has a first packet data network (PDN) connection through a first gateway; and select a second gateway for the second packet data network (PDN) connection based, at least partially, upon a determination that the request is for the multipath transmission control protocol (MPTCP) use, where the selecting of the second gateway avoids selection of the first gateway as the second gateway.

In accordance with another aspect, an example embodiment is provided in a non-transitory program storage device readable by a machine, tangibly embodying a program of instructions executable by the machine for performing operations, the operations comprising: determining if a request by a node for a second packet data network (PDN) connection is for a multipath transmission control protocol (MPTCP) use, where the node has a first packet data network (PDN) connection through a first gateway; and selecting a second gateway for the second packet data network (PDN) connection based, at least partially, upon a determination that the request is for the multipath transmission control protocol (MPTCP) use, where the selecting of the second gateway avoids selection of the first gateway as the second gateway.

In accordance with another aspect, an example embodiment is provided in an apparatus comprising means for determining if a request by a node for a second packet data network (PDN) connection is for a multipath transmission control protocol (MPTCP) use, where the node has a first packet data network (PDN) connection through a first gateway; and means for selecting a second gateway for the second packet data network (PDN) connection based, at least partially, upon a determination that the request is for the multipath transmission control protocol (MPTCP) use, where the selecting of the second gateway avoids selection of the first gateway as the second gateway.

In accordance with another aspect, an example method comprises receiving by a node a Management Object (MO), where the MO comprises an indication that a network is prepared for multipath transmission control protocol (MPTCP) use, where the node comprises a first packet data network (PDN) connection; and based, at least partially, upon reception by the node of the indication, transmitting from the node a request for a second packet data network (PDN).

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Features as described herein may be provided with a method, software and/or an apparatus. The rules and functionality may be used with multiple access networks for routing flows with MPTCP between a UE and a server. At least some of the rules may be placed in a management object (MO). At least some of the functionality may be executed by a UE, according to assistance of the management object (MO), and supported by the respective functionalities in the radio access network (RAN). Non-limiting descriptions are made herein regarding the RAN so that the PDN gateway, the Mobility Management Entity (MME), a Connection Management functionality, which in some embodiments are in the packet core network, is sometimes referred to as the RAN, because the RAN has the key impact thereto, in the core network.

Figure 1:
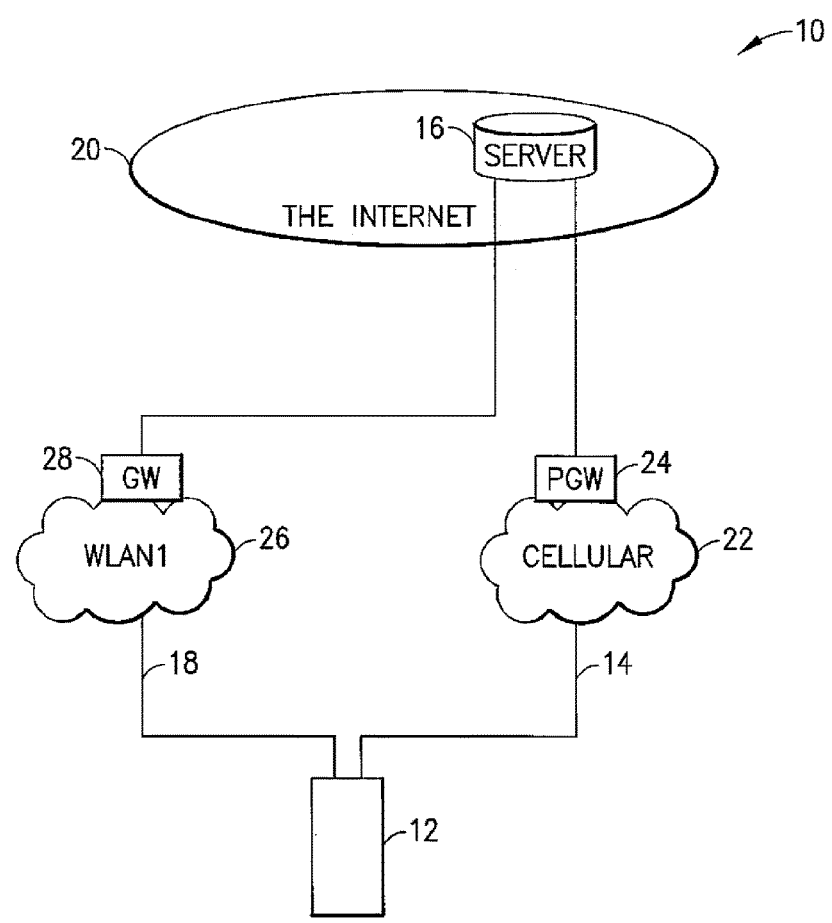
FIG. 1 is a diagram illustrating features of an example embodiment.

Referring to FIG. 1, there is shown a diagram illustrating a system 10 incorporating features of an example embodiment. Although the features will be described with reference to the example embodiments shown in the drawings, it should be understood that features can be embodied in many alternate forms of embodiments.

Figure 2:
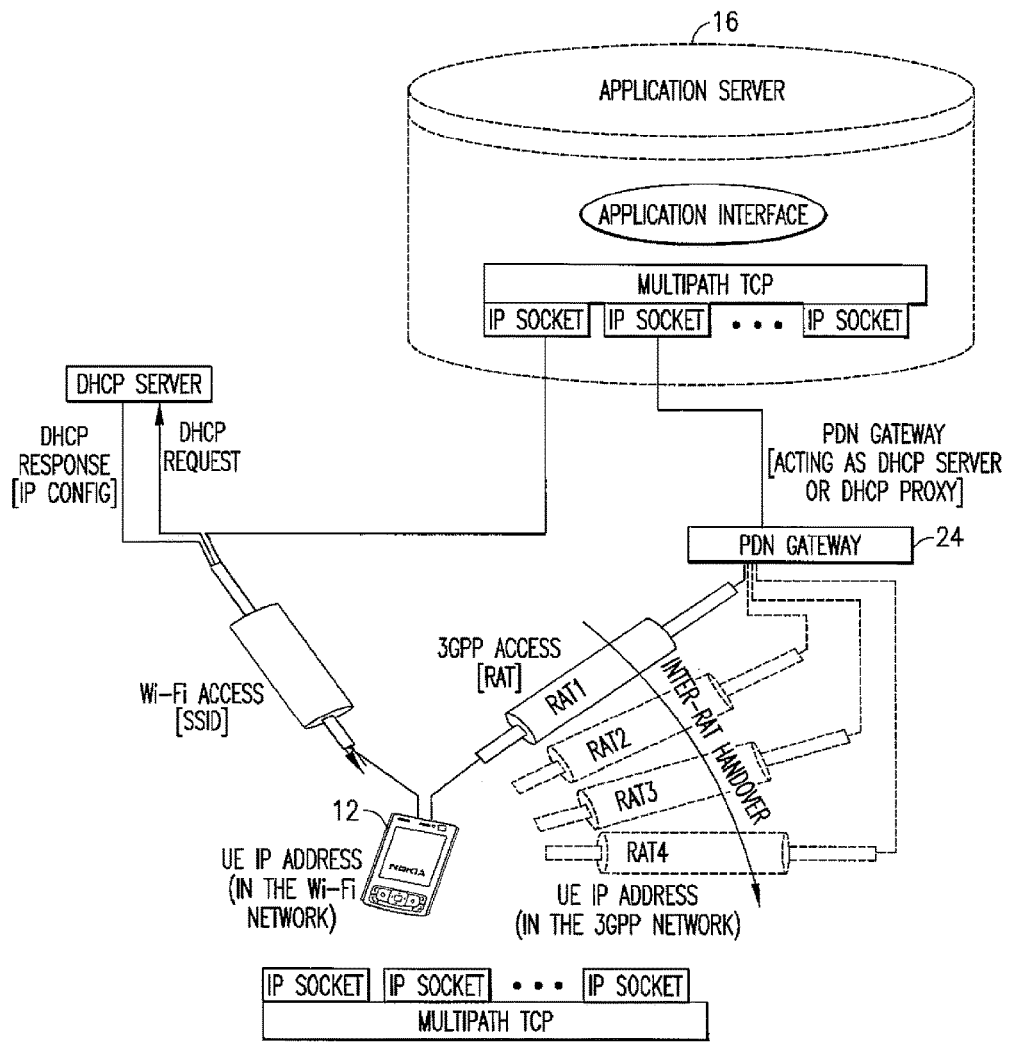
FIG. 2 is a diagram illustrating some of the features used in the example of FIG. 1.

The system includes a User Equipment (UE) 12, a first access 14 to a server 16, and a second access 18 to the server 16. In this example the server 16 is accessed through the internet 20. The first access 14 is by means of a radio access network (RAN) 22 including a PDN Gateway (P-GW) 24. The second access 18 is by means of a WLAN 26 having a gateway 28. The system may use MPTCP over two access networks at a same time. In an alternative example, a system comprising features as described herein may use MPTCP over more than two access networks. Referring also to FIG. 2, the PDN gateway 24 may provide an IP address to the UE 12, and UE 12 may acquire an IP address from the Dynamic Host Configuration Protocol (DHCP) server via the WLAN access network 26. The UE 12 may establish a MPTCP connection with the server 16 using these two IP addresses for the same TCP port. The UE 12 may get the IP addresses from different DHCP servers, e.g. one IP address from the PDN gateway (e.g. APN=Elisa internet, as an example of an operator offered Internet connectivity), which offers DHCP functionality itself (or which delivers the IP configuration by contacting a DHCP server on behalf of the client) and another one from the DHCP server reachable via the WLAN access network; not associated with any PDN gateway. An Access Point Name (APN) is the name of the network access point, which consists of network identifier and operator identifier. Network identifier defines to which external network the access network is connected to, via the PDN gateway (P-GW) of an operator. Operator identifier defines in which network the gateway is located (for example it may be the plmn of an operator or it is an Internet service provider). In addition to identifying the external network, an APN may also be used to define the type of service that is provided by the network in question, such as internet, multimedia messaging (MMS), IP Multimedia Subsystem (IMS) related service, etc.

Using WLAN access over an Access Point Name (APN) without the PDN gateway is called a Non-seamless WLAN offload (NSWO), because it works over an IP interface that is independent from the operator's gateway. Having multiple APNs offered enables the UE to select an APN for its specific use, such as Internet connection, IMS service or MMS service for example. This selection may happen by the user or it may happen by the connection manager of the device for example according to defined or configured policies. It is also possible that the application running on the device will make this selection. The device may also select more than one APN simultaneously from the multiple APNs available. In this situation, the device, the connection manager of the device or the application running in the device may decide, which traffic it uses via which APN. This can be guided by the traffic handling policies provided by the network. In case a device activated multiple APNs, traffic routing to different APNs may follow Inter-APN routing policy (IARP) that is provided by the network. This is an example of how the IARP may serve MPTCP. A MPTCP use case may generally assume that all related connections are for the same service. Thus, all connections may be mapped to the same APN (e.g. Internet). However, the selection of the PDN Gateway for each individual connection with the same APN is independent of the APN; the same APN for different connection can be mapped in the same or a different PDN Gateway.

Figure 3:
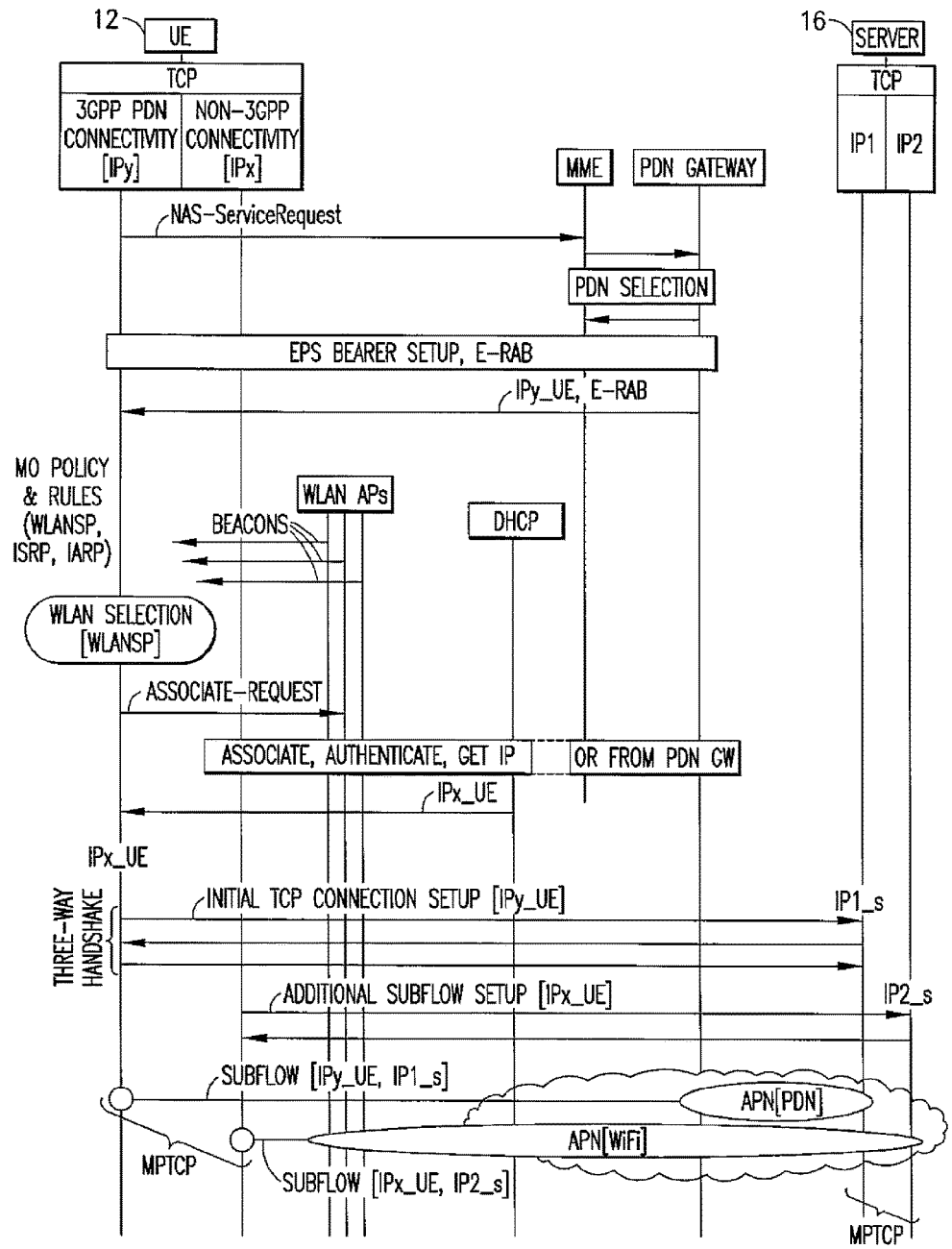
FIG. 3 is a diagram illustrating messaging steps to establish a MPTCP communication for the example shown in FIGS. 1-2.

Referring also to FIG. 3, an example of messaging according to features as described herein is shown. As can be seen from the various steps in this example, the UE 12 may use both connectivities 14, 18 to with MPTCP to the same server and APN; symbolized in this example by APN(PDN) and APN(Wi-Fi), where the APN(PDN) means the APN is available from the PDN gateway and the APN (Wi-Fi) means the APN is available from the gateway in the Wi-Fi network. The gateway in the Wi-Fi network can be the same gateway where the APN(PDN) is available. It can also be a different gateway. For the different gateway case, it may be referred to as Non-seamless WLAN Offload (NSWO). The message sequence chart shows multiple access connectivity, including WLAN access selection and TCP connection setup, where subflow addition forms a multipath TCP connection. This multipath TCP connection uses subflow routing via the 3GPP access network and via the Wi-Fi access networks.

Features as described herein may be applied to adapting the current 3GPP system specification for Multipath TCP (MPTCP) use. Although the MPTCP in principle is transparent to the underlying Internet Protocol (IP) based transport, certain aspects in the current 3GPP system specification may prevent the application of MPTCP over a 3GPP system. These aspects, i.e. problems, may be overcome with use of features as described herein.

Multipath TCP is standardized by the Internet Engineering Task Force (IETF) to enable multiple Internet transmission paths serve a same TCP connection. Multipath TCP increases the TCP throughput and improves robustness of the connection. MPTCP is especially beneficial when the Internet transmission paths are applied for the wireless communications over radio accesses, because radio accesses typically provide the throughput and robustness bottleneck of the end-to-end TCP connection. The throughput increases significantly because the properties of the radio access which limit the end-to-end throughput can be improved by serving the TCP connection via different radio accesses or via different radio cells within the same radio access using separate radio resources simultaneously. Using separate radio accesses further reduces congestion experienced by the TCP flow, because the radio accesses may not get congested simultaneously, or the mechanisms and conditions that cause congestion can be different in different radio access networks. This is because the impact of congestion that would be faced in one serving radio access network can be avoided or balanced by having the other radio access less congested at the same time. Robustness may be improved as the radio access providing better quality of service (QoS) for example due to shorter packet queues or lower packet error probability can be used more heavily at each time. Robustness and the decreased packet loss rate further increase TCP throughput and decreases delay contributing to the bandwidth-delay-product of the TCP connection. Bandwidth-delay-product is a key performance metric of the TCP connection. Therefore, increasing bandwidth and reducing delay has a major impact to the service experience.

Utilizing multiple radio access networks simultaneously, such as a 3GPP access and a non-3GPP access for example, is a tedious task. Therefore, it is assisted by access selection policies and routing policies that are delivered to the User Equipment (UE) by the network in a form of a Management Object (MO). The 3GPP standardized MO is called Access Network Discovery and Selection Function (ANDSF), and it is given in Extensible Markup Language (XML). The ANDSF MO may include inter-APN routing policies (IARP), WLAN selection policies (WLANSP), Inter-system mobility polices (ISMP) and inter-system routing policies (ISRP). The UE executes selected rules, called active rules, from the set of rules defined for the policies present in the MO. The selection policies direct the traffic via a single selected radio access only, whereas the routing policies utilize routing via multiple accesses simultaneously.

In legacy 3GPP technologies, inter-Radio Access Technology (RAT) handover procedures prevent two radio accesses from being available at a same time for the PDN connection. Instead, from the available RATs, the most feasible one is selected at the time to be the serving RAT for a UE. Therefore, multiple radio access networks (RANs) that can serve simultaneously need to be from different technologies, such as a first one using 3GPP technology and a second one using a non-3GPP technology. The most common combination for multiple serving radio access networks of a UE is 3GPP and Wi-Fi for example.

A problem with the current 3GPP system specification and MPTCP is that the current 3GPP system specification does not support the allocation of multiple IP addresses for a single Access Point Name (APN) over more than one access networks. For example, for APN=Internet, representing the internet as the external network, the current 3GPP system specification does not support the allocation of multiple IP addresses for the APN over more than one access networks. If the UE requests a new packet Data Network (PDN) connection to an APN that is already active for the UE over another access network, the network rejects this additional PDN connection request.

In the current 3GPP system specification, without MPTCP, there are reasons why a request for a new packet Data Network (PDN) connection to an APN, that is already active for the UE over another access network, should be rejected by the network. However, these reasons are not valid for a UE attempting to use Multipath TCP (MPTCP), because with multipath TCP there is a legitimate need for two different IP addresses. For this reason, the different IP addresses are needed also when pointing to the same APN over different access networks. Thus, without the invention described herein there would be a hinder when trying to use MPTCP on a 3GPP system.

As described herein, a feature may comprise the UE making the network aware of the reason why the UE is requesting an additional PDN connection(s) to an APN over different access networks. Furthermore, from the point of view of the available benefits from the Multipath TCP (MPTCP), the common APN over different access networks, although representing the same type of Packet Data Network (e.g. internet), may be mapped to two different PDN Gateways (P-GW) for maximum route redundancy. By mapping the APN to two different P-GWs the Mobile Network Operator can also benefit in its core network interfaces from the UE's capability to apply MPTCP. The current 3GPP specification only allows parallel active PDN connections (over one access only) to a same APN to be allocated to the same P-GW. Features as described herein propose that the current 3GPP system specification be changed to allow the use of more than one P-GW for the PDN connections of the UE to the same APN.

Currently, a UE does not get network guidance for the radio access selection for the use of MPTCP. For an intended use of MPTCP between a UE and a server, such policies and rules are not present. As proposed herein, such policies and rules may be provided to thereby allow the UE to make access selections that are favorable for MPTCP, or which prevent access selections that are not favorable for MPTCP, or could become disablers for the MPTCP opportunity. Thus, a feature as described herein is to provide the UE with network guidance for the radio access selection for the use of MPTCP.

As described earlier, the scenario for MPTCP necessitates offering to the UE two (or more) Internet Protocol (IP) addresses for one type of traffic, such as over different access networks for example. The conventional approach for access network selection policies in the 3GPP specification is to always prefer only one access for any given service (APN) or IP flow. Consequently, the operating logic with the current policies is to steer any specific traffic to only one access network; either the cellular access or one of the available non-3GPP access networks. Such logic, to steer any specific traffic to only one access network, is contrary to MPTCP using multiple paths (sub-paths).

Features as described herein may be used to change the 3GPP system behavior with respect to the management and control of the PDN connections and selection of P-GWs. This may involve, primarily, the session management sub-layer of the Non-Access Stratum (NAS) protocol and procedures between UE and the network.

Because a UE is assumed to be able to attach only to one WLAN Access Point (SSID) at any given time, it is assumed that the two access networks involved in any UE's MPTCP session are, by default, one non-3GPP (WLAN) access and one 3GPP radio access. FIGS. 1-2 illustrate one option. In this NSWO option, one of the IP addresses has been assigned to the UE by the P-GW in the Mobile Network Operator's (MNO's) core network. The other IP address is assigned by the WLAN network independently. In this option the MNO's core network is not aware of the IP connectivity over the WLAN access. However, even for this option the Mobile Network Operator can offer new guidance and policies via ANDSF to support MPTCP use by the UE.

Figure 4:
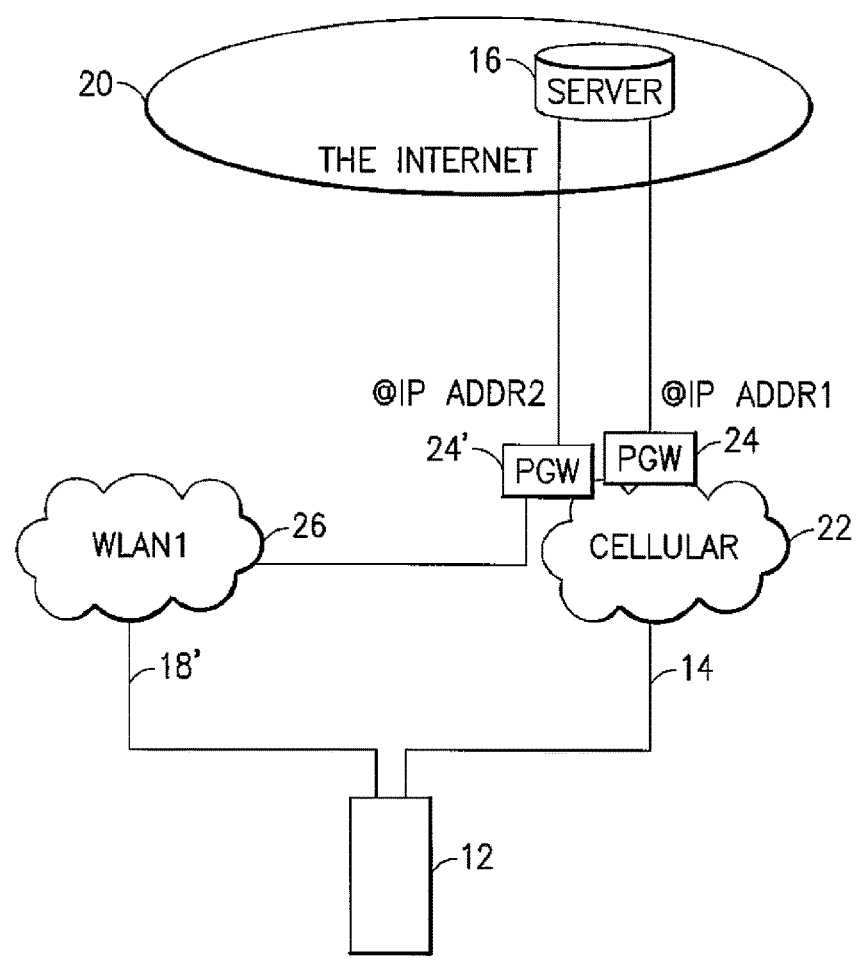
FIG. 4 is a diagram illustrating features of another example.
Figure 5:
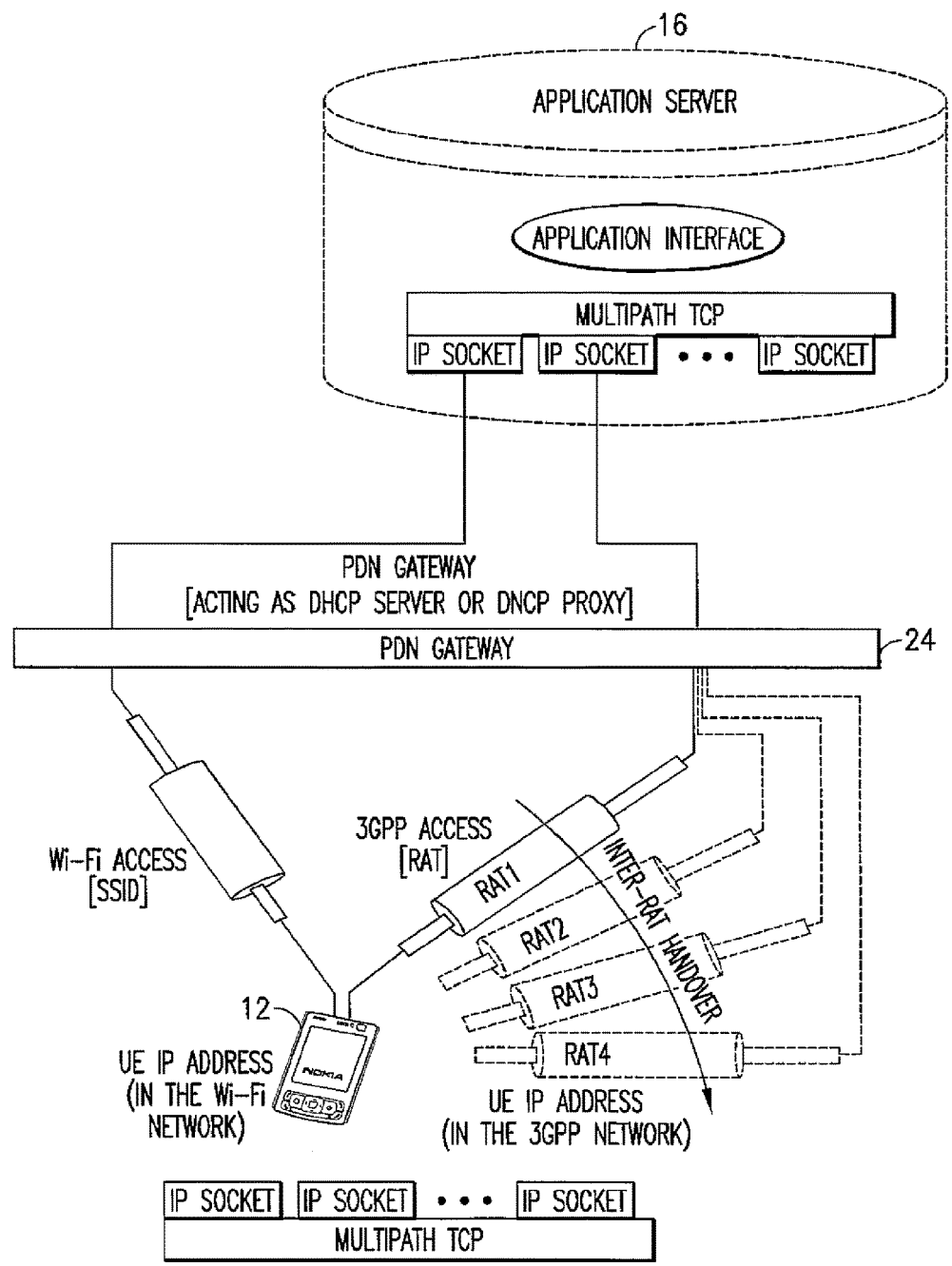
FIG. 5 is a diagram illustrating some of the features used in the example of FIG. 1.

FIGS. 4 and 5 illustrate a second option. Features as described herein apply to the scenarios where the entire MPTCP session is conducted over one access network. In this second option, EPC routed, both IP addresses are assigned from the MNO's IP address space in the PDN Gateways (P-GW). This option assumes an interworking scenario between the WLAN access and the Evolved Packet Core (EPC), such as via S2a, S2b or S2c interface between the two for example. To ensure maximum path redundancy, the two addresses, although having the same APN, may be assigned by two different P-GWs. In such a deployment where the network is designed to offer multipath support, it may be assumed that the P-GW allocation is done accordingly. To enable this second option, the following novel capabilities may be added into the 3GPP system specification and hence implemented to the apparatus:

The 3GPP system specification may be changed to allow the creation of two (or more) PDN connections to a same APN over two (or more) access networks.

The 3GPP system specification may be changed to enable the UE to explicitly indicate, such as in the PDN connection request for example, that the requested additional PDN connection is for multipath TCP (MPTCP) use. This explicit indication in the PDN creation may then allow the network to make an exception in the PDN connection establishment. Thus, when knowing that the duplicate PDN connection over different access is for multipath TCP, the network may allow its establishment even though the UE already has an active PDN connection to the same APN over another access network.

Furthermore, the explicit indication, such as in the PDN connection request, may allow the receiving network entity (such as MME, WLAN Gateway, ePDG or equivalent) to trigger multipath TCP optimized PDN GW selection logic. Use of this logic may result in the allocation of a different PDN Gateway, different from the P-GW already serving this UE and APN, for the new PDN connection marked for MPTCP use. This way the MNO can also benefit from the UE's use of MPTCP. While such explicit indication in the request message serves its purpose well, it may also be omitted in certain deployments where the network policy (ANDSF) indicates the support for MPTCP in the given access network.

Some of the examples as described herein are presented with the multiple access network selection including 3GPP and non-3GPP (i.e. Wi-Fi) access networks. However, as noted above, features may be used within 3GPP technology alone in accordance with its dual connectivity solution, where the UE may have multiple serving cells from multiple eNBs connected to different serving radio access network gateways at a same time. The radio access of the Master Cell Group (MCG) from one eNB and the radio access of the Secondary Cell Group (SCG) from another eNB may be concurrently used, such as according to the 3GPP TSG-RAN2 WG2 decided architecture 1A for 3GPP Release 12 for example. Yet, a further extension covered by an embodiment of the invention is IP breakout using 3GPP access in dual connectivity. IP breakout provides one IP address from the P-GW of the 3GPP network and the other IP address from outside the 3GPP network, however having the 3GPP radio access technology in use concurrently, in these IP connections.

Features as described herein provide mechanisms for the Access Network Discovery and Selection Function Management Object (ANDSF MO), or similarly for a Hotspot MO, to include WLAN Selection Policy (WLANSP), Inter-Access Point Name (APN) routing policy (IARP) and Inter-System Routing Policy (ISRP) such as according to TR 23.865 and TS24.312 for example. Rules, conditions and descriptions may be introduced to manage, when and how the MPTCP of a flow can be established. That is, when the network is prepared to handle certain traffic of the UE over two access networks simultaneously. In such deployment the network may have been configured more optimally for multipath TCP use such as, for example, from the point of view of P-GW allocation, route redundancy, quality of service and security. In scenarios where the network is not prepared for MPTCP, as intended in the spirit of the original MPTCP protocol. If the radio accesses in use are not considered trusted, or not considered as having comparable security level and authentication from the MNO's point of view, the operator's gateway or the operator's authentication server may not grant permission to open simultaneous IP Interfaces for these connections, which then means that the UE and the application server are not able to mutually establish subflows needed for the MPTCP connection. Note that a conventional TCP connection may still operate. Therefore, with features as described herein, these allowances or restrictions of the access network selection and routing for MPTCP may be added to the MO description, which then assists the UE to make such access network selections that allow, at the UEs connection request for multiple PDN connections, the operator's gateway and authentication server to grant UE permission to open simultaneous IP interfaces for the requested PDN connections. Without the assistance information in the MO, the UE would not know how and which access networks it should select, in case it aims at establishing a MPTCP connection. Further, the UE would know better, with the assistance information, whether it is feasible to make a connection request for multiple PDN connections for its aim of establishing MPTCP, using these selected radio access networks.

A UE that is capable of routing different simultaneously active PDN connections through different access networks (MAPCON) may use its different IP addresses given by the PDN gateway to serve MPTCP. This is shown in FIG. 5. The PDN gateway providing two IP addresses to the UE, which may establish a MPTCP connection with a server using these two IP addresses for the same TCP port. The PDN connection is served over the 3GPP and Wi-Fi access.

Examples how the WLANSP, IARP or ISRP rules may be modified for the case MPTCP is intended to be used are further described below. The WLANSP could be modified in the following way:

```
WLANSP with MPTCP:
    In case of MPTCP {                              ; necessary conditions for selecting WLAN
                                                      for MPTCP
        WLAN-1                                      ; WLAN-1 is only allowed for MPTCP
        PSPL = 'partner'                            ; preferred partner network service provider
        MimimumBackhaulThreshold = 10 Mbps; minimum performance limits
        Maximum BSS_load = low
    }
    else {                                          ; prioritized list of WLAN selection
        WLAN-1 (priority 1)
        WLAN-4, WLAN-2 (priority 2)
        WLAN-3 (priority 3)
    }
``` prepared for MPTCP, a UE's request for an additional IP address (PDN connection in the P-GW) in addition to the one it already has over the other access network (such as similar to FIGS. 4-5), may still lead to the rejection of this additional PDN connection request. With the new information in the MO, the UE knows in advance if the candidate access network is prepared for MPTCP. Depending on the application in the UE, this information may be valuable in assessing the priority of the available access networks.

The earlier descriptions in the WLANSP, neither in the IARP nor ISRP, include any conditions and handling of MPTCP flows. The novel additions allow the access networks and the IP addresses that are obtained be provided in a trusted manner. This offers a freedom to be left to the application server and the UE to decide on the use of In order to select a WLAN for MPTCP, it has to be a given WLAN (such as having a s2a-interface for example), it may support the cellular operator PLMN as a partner in the service provider list and it provides sufficient performance (and link quality).

IARP without MPTCP is currently contributed to TS 23.402 Release 12 as follows;

One or more Filter Rules, each one identifying a prioritized list of APNs which shall be used by the UE to route IP flows that match specific IP filters (e.g. all flows to a specific TCP port or to a specific destination address, etc). The Filter Rules may also identify which APNs are restricted for IP flows that match specific IP filters.

```
IARP with MPTCP:
  In case of MPTCP {
    PSPL                                                              ; preferred partner network service provider
    List [APN(Wi-Fi), APN(Wi-Fi),...] subflow[IP address x] = 'partner'    ; list of
    allowed Wi-Fi APNs
    APN(3GPP PDN) subflow[IP address y]                                ; APN from the
                                                                         3GPP PDN TCP port /IP address [filters] = don't re-route
                                                                       ; allow subflows for MPTCP
  }
  else {
    PSPL                                                              ; preferred partner network service provider
    List [APN] = 'partner'                                              ; list of allowed APNs
    IP [filters]                                                        ; flow filters for Inter-APN routing
  }
```

For Inter-System routing policies MPTCP can impact to the routing rules. An example is given by the script below. If the access selection enables APN, which handles MPTCP, a traffic flow can be mapped concurrently to the allowed accesses of a PDN. Therefore, MPTCP traffic flow is not alone guided to be routed to a single selected radio access (per flow) but is instead split across multiple access networks. The valid rules of a policy may be tested for the MPTCP condition, and if the condition is valid, the highest priority valid rule will become the active rule. In this example there is one active routing rule executed by the UE at a time.

DNS interactions for discovering the P-GW. The network (e.g., AAA, ePDG) may be made aware of the reason for selecting a different P-GW.

Once the network receives a request for an additional PDN connection for MPTCP, the PDN Gateway selection function may be performed in a new and novel way. Instead of rejecting the new PDN connection request based on the condition where the UE already has a PDN connection for the same APN over a different access network, the network may now acknowledge the need for the new connection and select the PDN Gateway accordingly. Provided that the Mobile Network Operator's deployment supports multiple

```
ISRP with MPTCP:
  In case of MPTCP {
    ISMP = not active                          ; flow mobility is not selected to allow MPTCP
    ISRP = MAPCON[APN(wi-Fi), APN(Wi-Fi),...][APN(3GPP-PDN)]
                                               ; list of allowed accesses of PDN
    Traffic [filters], TCP port / subflow[IP address x] subflow[IP address y] [filters] = don't
    reroute
  }
  else {
     traffic [filters, tp_threshold] = route APN(WLAN)     ; routing rules
                                                             without MPTCP
     traffic [filters, tp_threshold] = route E-RAB          ; routing
                                                             rules without
                                                             MPTCP
  }
```

As noted above, another feature may be provided apart from the Management Object aspects described above. An indication may be introduced in the session management signaling of 3GPP specification (NAS protocol, the new WLAN Control Protocol, and equivalent protocols) to allow the UE to indicate, when requesting an additional PDN connection, that such PDN connection is for MPTCP use. Such indication is relevant in the UE Requested PDN Connectivity Request procedure [such as similar to chapter 5.10.2. in TS23.401 for example]. The similar type of protocol and the corresponding procedures and node behavior for PDN connection management (i.e., session management) for PDN connections over the WLAN access is yet to be defined in the current 3GPP specification. For a S2c interface based interworking, the indication of the MPTCP in the corresponding protocol signaling may still be beneficial for the similar reason as in the S2a/b scenario. For example, this may be where the UE is either receiving the available P-GW addresses in Protocol Configuration Options (PCO) and then selecting the P-GW itself, or is using IKEv2 protocol for setting up the tunnels for PDN connections over the WLAN access, or is using DHCP or P-GWs for the same APN, the selection logic may then be performed in a novel way where the APN is mapped to a different P-GW from the one where the UE's existing PDN connection has been created for the same APN. This way the MNO can benefit from the more distributed routing of the UE's internet traffic.

In one deployment scenario the MNO may have prepared the network for MPTCP and implemented the above mentioned capabilities there. The MNO may indicate this to the UEs by adding the information in the ANDSF MO as described earlier. In this deployment the UE's do not have to support the new indication of MPTCP in the PDN connection requests. Instead, the network may implicitly assume that the UE is requesting a duplicate PDN connection for MPTCP use.

With features as described herein, the UE may be aware of the networks where MPTCP is allowed or is not allowed. This may insure a successful creation of parallel PDN connection(s); for the UE's MPTCP protocol implementation to use those connections for multipath TCP. In cases where the UEs are prepared for MPTCP use, this may insure the allowance of a beneficial network deployment/configuration from the Mobile Network Operator's viewpoint in their core network routing. This may insure MPTCP operation in a trusted and collaborative manner over the selected 3GPP and non-3GPP accesses. Without features as described herein, the benefits of MPTCP may not become available for 3GPP, because the radio access selection may not support routing a flow of the same TCP connection using multiple IP addresses via two paths over the radio access networks.

The MO with its MPTCP rules and conditions may be executed by the UE. MPTCP between a UE and server may become established using the ANDSF MO guidance for the access selection. MPTCP may be observed from a single TCP port (source and destination) using subflows of two IP addresses implementing the multipath transmission. MPTCP is defined to handle the establishment of subflows over multiple IP addresses. It is also defined to be able to drop one of its serving IP addresses not serving the MPTCP port any more, which resembles the operation of a conventional TCP. Adding and dropping, hence changing, IP addresses and subflows of a MPTCP connection is feasible during the lifetime of a MPTCP connection. For the link path management, MPTCP runs joint-congestion control algorithms in place of the congestion control algorithms of the conventional TCP. Joint-congestion control algorithms provide faster link ramp-up, higher reachable throughput and more robust transmissions.

UE connectivity and ANDSF MO may be provided by the network and implemented in the UE. Session management protocol information and procedures may be provided in the network element implementations in MME, in WLAN Access Gateway (e.g. a Trusted WLAN Access Gateway), in AAA server.

Figure 6:
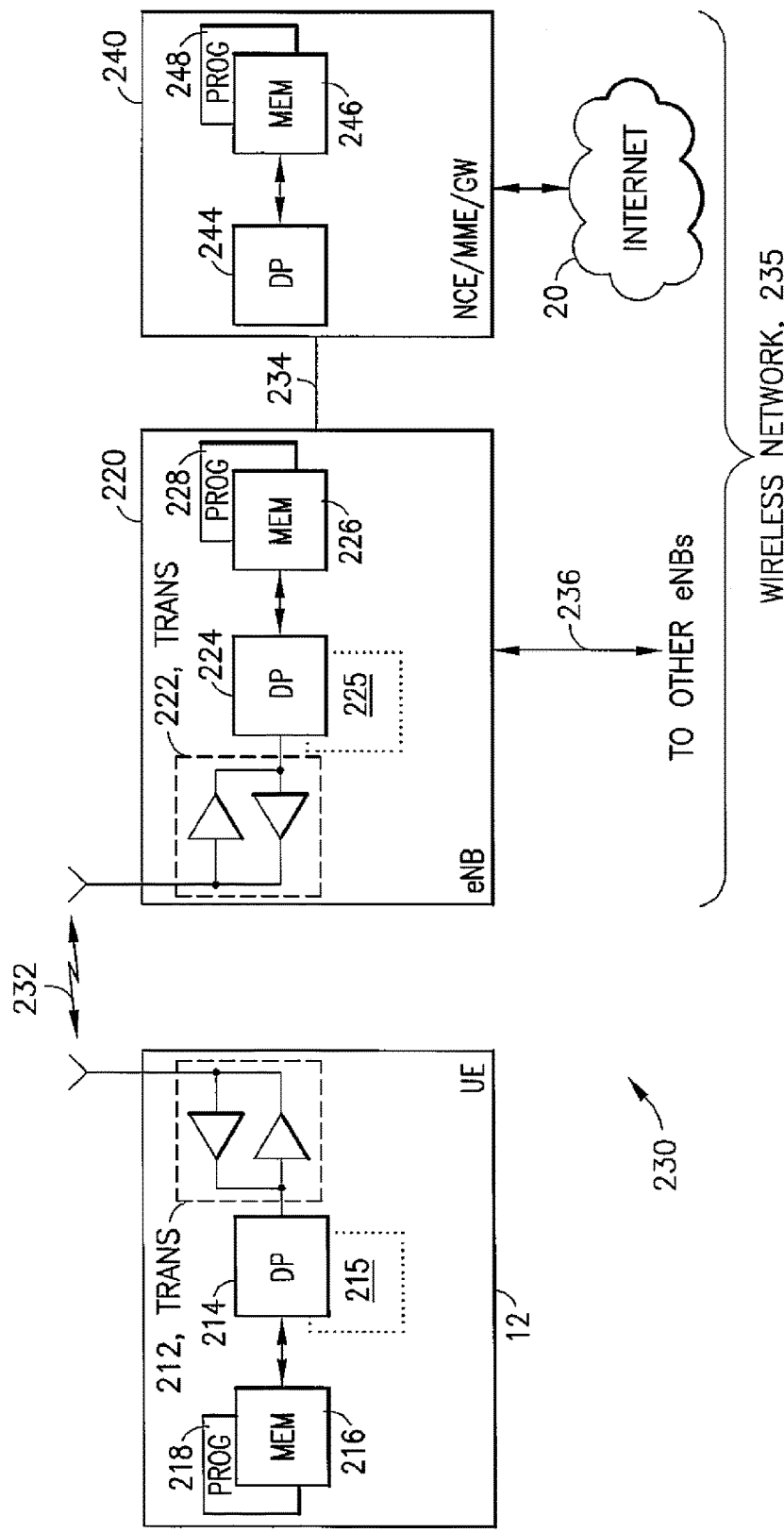
FIG. 6 is a diagram illustrating some of the components shown in FIGS. 1-5.

Referring also to FIG. 6, a wireless communication system 230 may comprise communication stations 220 which form cells. Some of the cells overlap one another. The user equipment (UE) 12 may move in and out of the various cells as the UE 12 travels. In the wireless system 230 a wireless network 235 is adapted for communication over a wireless link 232 with an apparatus, such as a mobile communication device which may be referred to as a UE 12, via a network access node, such as a Node B (base station), and more specifically an eNB 220. The network 235 may include a network control element (NCE) 240 that may include MME/gateway (SGW) functionality, and which provides connectivity with a network, such as a PDN, a voice/muiltimedia network (IMS) and/or a data communications network (e.g., the internet 20).

The UE 12 includes a controller, such as a computer or a data processor (DP) 214, a computer-readable memory medium embodied as a memory (MEM) 216 that stores a program of computer instructions (PROG) 218, and a suitable wireless interface, such as radio frequency (RF) transceiver 212, for bidirectional wireless communications with the eNB 220 via one or more antennas.

The eNB 220 also includes a controller, such as a computer or a data processor (DP) 224, a computer-readable memory medium embodied as a memory (MEM) 226 that stores a program of computer instructions (PROG) 228, and a suitable wireless interface, such as RF transceiver 222, for communication with the UE 12 via one or more antennas. The eNB 220 is coupled via a data/control path 234 to the NCE 240. The path 234 may be implemented as an interface. The eNB 220 may also be coupled to another eNB via data/control path 236, which may be implemented as an interface.

The NCE 240 includes a controller, such as a computer or a data processor (DP) 244, a computer-readable memory medium embodied as a memory (MEM) 246 that stores a program of computer instructions (PROG) 248.

At least one of the PROGs 218, 228 and 248 is assumed to include program instructions that, when executed by the associated DP, enable the device to operate in accordance with exemplary embodiments. That is, various exemplary embodiments of this invention may be implemented at least in part by computer software executable by the DP 214 of the UE 12; by the DP 224 of the eNB 220; and/or by the DP 244 of the NCE 240, or by hardware, or by a combination of software and hardware (and firmware).

For the purposes of describing various exemplary embodiments in accordance with this invention the UE 12 and the eNB 220 may also include dedicated processors, for example RRC module 215 and a corresponding RRC module 225. RRC module 215 and RRC module 225 may be constructed so as to operate in accordance with various exemplary embodiments in accordance with this invention.

In general, the various embodiments of the UE 12 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, communicators, tablets, pads, wearable computers as well as portable units or terminals that incorporate combinations of such functions. The functionalities of a 'device' may be distributed to multiple modules such as, for example, in a vehicle, in a car, in a robot or over a human body as wearable computing, communications and their combination.

The computer readable MEMS 216, 226 and 246 may be of any type suitable to the local technical environment and may be implemented using any suitable data storage technology, such as semiconductor based memory devices, flash memory, magnetic memory devices and systems, optical memory devices and systems, fixed memory and removable memory. The DPs 214, 224 and 244 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 212 and 222) may be of any type suitable to the local technical environment and may be implemented using any suitable communication technology such as individual transmitters, receivers, transceivers or a combination of such components.

Figure 7:
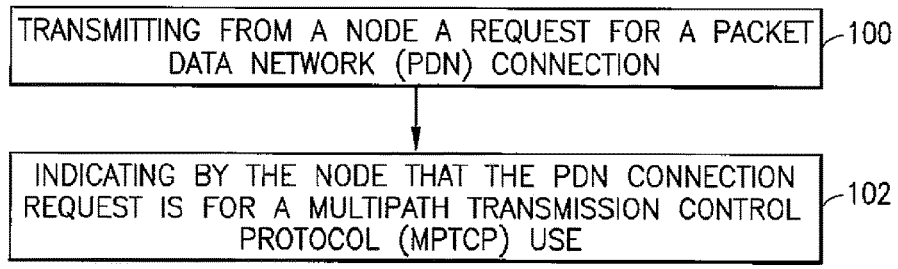
FIG. 7 is a diagram illustrating an example method.

Referring also to FIG. 7, an example method may comprise transmitting from a node a request for a packet data network (PDN) connection as indicated by block 100; and indicating by the node that the PDN connection request is for a multipath transmission control protocol (MPTCP) use as indicated by block 102.

The node may have a current packet data network (PDN) connection when the request for a packet data network (PDN) connection is transmitted, and the node may be connected to an Access Point Name (APN) through the current packet data network (PDN) connection and the node request for a packet data network (PDN) connection is to the same Access Point Name (APN) or to another APN that offers similar type of network connection as the APN of the first PDN connection. Thus, there may be different APNs, but such APNs may be for similar service. An example way how the APNs are named in any MNO's network may be, at least to some extent, MNO specific. For example, in one type of network there may be internet1 and internet2 as well as internet and prointernet APNs. However, all of these APNs may be for internet service.

The node may have a first packet data network (PDN) connection when the request is transmitted, where the request is for a second packet data network (PDN) connection, where the first packet data network (PDN) connection is through a PDN gateway, and where the request for the second packet data network (PDN) connection is also through a PDN gateway.

An example embodiment may be provided in an apparatus comprising at least one processor; and at least one non-transitory memory including computer program code, the at least one memory and the computer program code configured to, with the at least one processor, cause the apparatus at least to: transmit from the apparatus a request for a packet data network (PDN) connection; and indicate by the apparatus that the PDN connection request is for a multipath transmission control protocol (MPTCP) use.

The node may have a current packet data network (PDN) connection when the request for a packet data network (PDN) connection is transmitted, where the request for a packet data network (PDN) connection is requesting a second packet data network (PDN) connection, and where the node is connected to an Access Point Name (APN) through the current packet data network (PDN) connection and the request for the second packet data network (PDN) connection is to the same Access Point Name (APN). The node may have a first packet data network (PDN) connection when the request is transmitted, where the request is for a second packet data network (PDN) connection, where the first packet data network (PDN) connection is through a PDN gateway, and where the request for the second packet data network (PDN) connection is also through a PDN gateway An example embodiment may be provided in a non-transitory program storage device, such as 216 for example, readable by a machine, tangibly embodying a program of instructions executable by the machine for performing operations, the operations comprising: transmitting from a node a request for a packet data network (PDN) connection; and indicating by the node that the PDN connection request is for a multipath transmission control protocol (MPTCP) use.

An example embodiment may be provided in an apparatus comprising: means for transmitting from a node a request for a packet data network (PDN) connection; and means for indicating by the node that the PDN connection request is for a multipath transmission control protocol (MPTCP) use.

Figure 8:
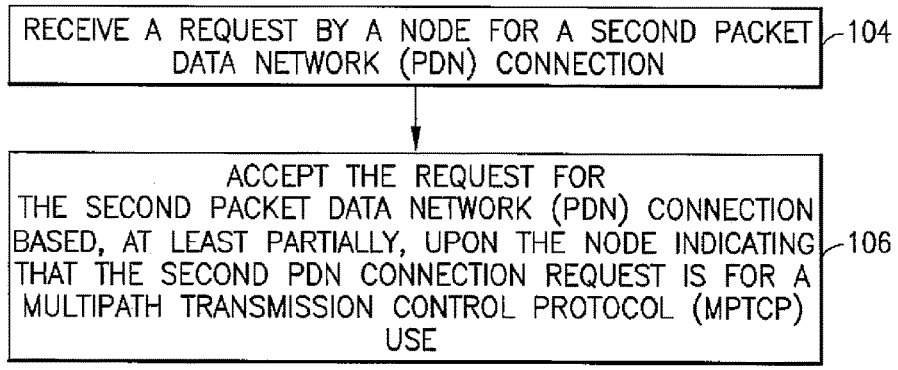
FIG. 8 is a diagram illustrating an example method.

Referring also to FIG. 8, an example method may comprise receiving a request by a node for a second packet data network (PDN) connection as indicated by block 104, where the node has a first packet data network (PDN) connection; and accepting the request for the second packet data network (PDN) connection based, at least partially, upon the node indicating that the second PDN connection request is for a multipath transmission control protocol (MPTCP) use as indicated by block 106.

The method may further comprise alternatively not accepting the request based upon the node not indicating that the second PDN connection request is for a multipath transmission control protocol (MPTCP) use. The node may be connected to an Access Point Name (APN) through the first packet data network (PDN) connection and the request for the second packet data network (PDN) connection is to the same Access Point Name (APN). The first packet data network (PDN) connection may be through a PDN gateway, and where the request for the second packet data network (PDN) connection is also through a PDN gateway.

An example embodiment may be provided in an apparatus comprising at least one processor; and at least one non-transitory memory including computer program code, the at least one memory and the computer program code configured to, with the at least one processor, cause the apparatus at least to: determine if a node has a first packet data network (PDN) connection; and accepting a request by the node for a second packet data network (PON) connection based, at least partially, upon the node receipt of an indication that the second PDN connection request is for a multipath transmission control protocol (MPTCP) use.

The apparatus may be further configured to alternatively not accept the request based upon the node not indicating that the second PDN connection request is for a multipath transmission control protocol (MPTCP) use. The node may be connected to an Access Point Name (APN) through the first packet data network (PDN) connection and the request for the second packet data network (PDN) connection is to the same Access Point Name (APN). The first packet data network (PDN) connection may be through a PDN gateway, and where the request for the second packet data network (PDN) connection is also through a PDN gateway.

An example embodiment may be provided in a non-transitory program storage device, such as memory 246 for example, readable by a machine, tangibly embodying a program of instructions executable by the machine for performing operations, the operations comprising: determining if a node has a first packet data network (PDN) connection; and accepting a request by the node for a second packet data network (PDN) connection based, at least partially, upon receipt of an indication that the second PDN connection request is for a multipath transmission control protocol (MPTCP) use.

An example embodiment may be provided in an apparatus comprising means for determining if a node has a first packet data network (PDN) connection; and means for accepting a request by the node for a second packet data network (PDN) connection based, at least partially, upon receipt of an indication that the second PDN connection request is for a multipath transmission control protocol (MPTCP) use.

Figure 9:
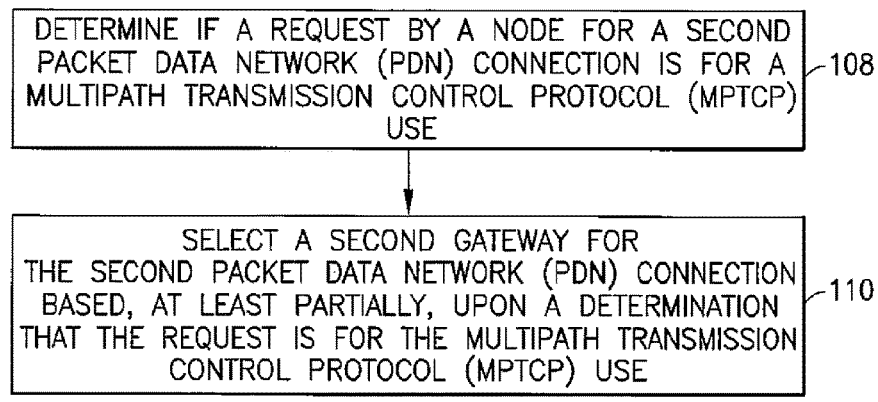
FIG. 9 is a diagram illustrating an example method.
Figure 11:
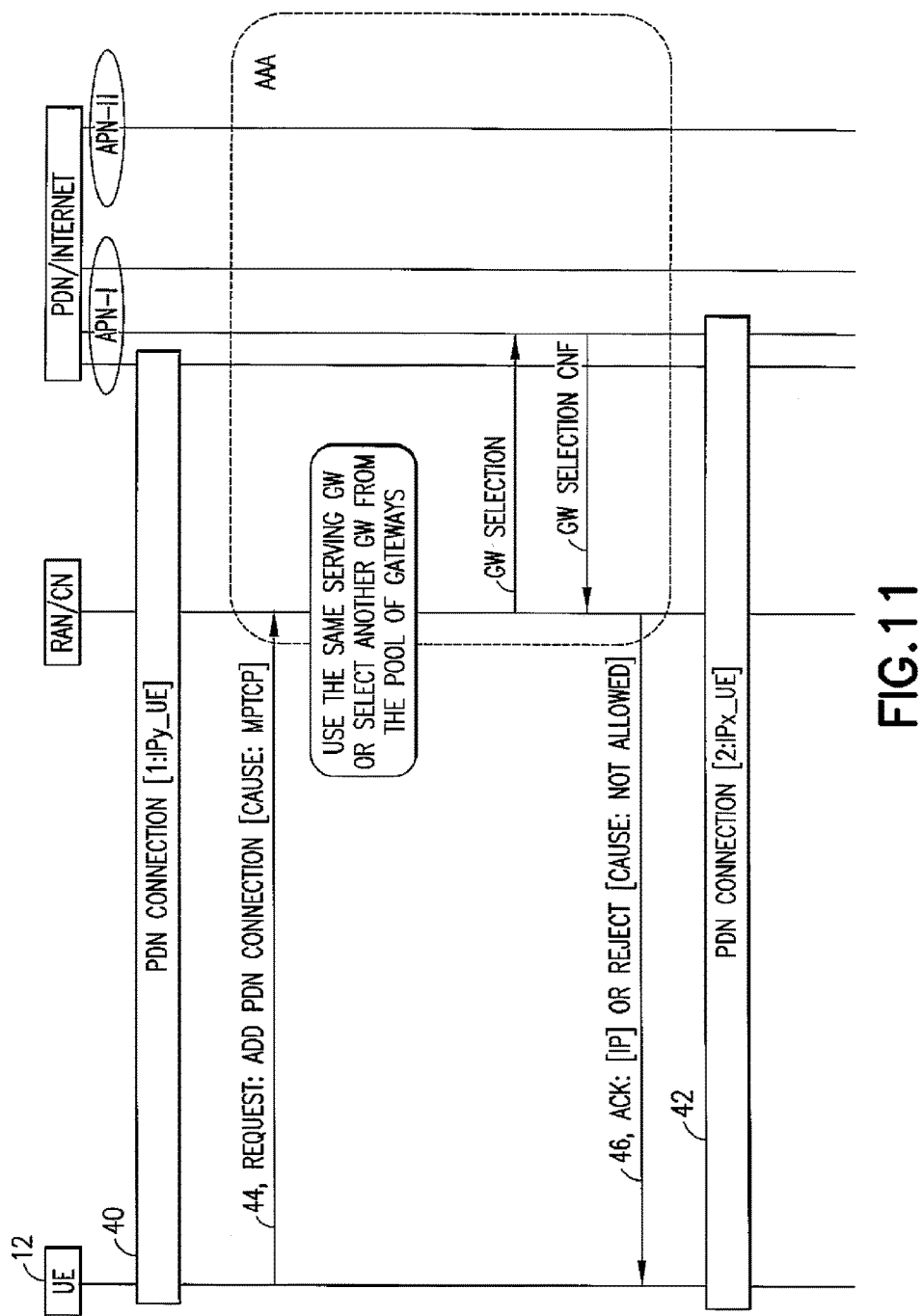
FIG. 11 is a diagram illustrating an example method for establishing a second PDN connection when a node already has a first PDN connection.

Referring also to FIG. 9, an example method may comprise determining if a request by a node for a second packet data network (PDN) connection is for a multipath transmission control protocol (MPTCP) use as indicated by block 108, where the node has a first packet data network (PDN) connection through a first gateway; and selecting a second gateway for the second packet data network (PDN) connection based, at least partially, upon a determination that the request is for the multipath transmission control protocol (MPTCP) use as indicated by block 110, where the selecting of the second gateway avoids selection of the first gateway as the second gateway. FIG. 11 illustrates an example method for establishing a second PDN connection 42 when the UE already has a first PDN connection 40. The UE makes a request 44 to add a PDN connection. The network makes a gateway selection, such as a same gateway or another gateway from a pool of gateways and indicates the gateway selection. The authentication procedures involve the AAA functionality. The UE may receive a rejection if the request is rejected (perhaps with a cause indication), or may receive an acknowledgement with an IP address configuration if the request is accepted as indicated by 46.

The node may be connected to an Access Point Name (APN) through the first packet data network (PON) connection and the request for the second packet data network (PDN) connection is to the same Access Point Name (APN). The first packet data network (PON) connection may be through a PDN gateway, and where the request for the second packet data network (PDN) connection is also through a PDN gateway.

An example embodiment may be provided in an apparatus comprising at least one processor; and at least one non-transitory memory including computer program code, the at least one memory and the computer program code configured to, with the at least one processor, cause the apparatus at least to: determine if a request by a node for a second packet data network (PDN) connection is for a multipath transmission control protocol (MPTCP) use, where the node has a first packet data network (PDN) connection through a first gateway; and select a second gateway for the second packet data network (PDN) connection based, at least partially, upon a determination that the request is for the multipath transmission control protocol (MPTCP) use, where the selecting of the second gateway avoids selection of the first gateway as the second gateway.

The node may be connected to an Access Point Name (APN) through the first packet data network (PDN) connection and the request for the second packet data network (PDN) connection is to the same Access Point Name (APN). The first packet data network (PDN) connection may be through a PDN gateway, and where the request for the second packet data network (PDN) connection is also through a PDN gateway.

An example embodiment may be provided in a non-transitory program storage device, such as memory 246 for example, readable by a machine, tangibly embodying a program of instructions executable by the machine for performing operations, the operations comprising: determining if a request by a node for a second packet data network (PDN) connection is for a multipath transmission control protocol (MPTCP) use, where the node has a first packet data network (PDN) connection through a first gateway; and selecting a second gateway for the second packet data network (PDN) connection based, at least partially, upon a determination that the request is for the multipath transmission control protocol (MPTCP) use, where the selecting of the second gateway avoids selection of the first gateway as the second gateway.

An example embodiment may be provided in an apparatus comprising means for determining if a request by a node for a second packet data network (PDN) connection is for a multipath transmission control protocol (MPTCP) use, where the node has a first packet data network (PDN) connection through a first gateway; and means for selecting a second gateway for the second packet data network (PDN) connection based, at least partially, upon a determination that the request is for the multipath transmission control protocol (MPTCP) use, where the selecting of the second gateway avoids selection of the first gateway as the second gateway.

Figure 10:
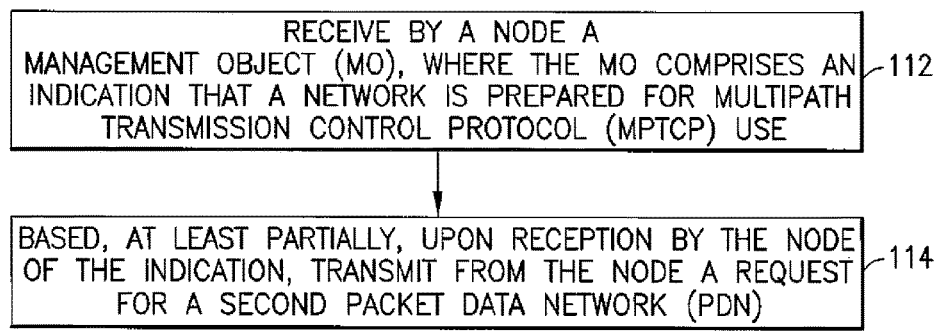
FIG. 10 is a diagram illustrating an example method.

Referring also to FIG. 10, an example method may comprise receiving by a node a Management Object (MO) as indicated by block 112, where the MO comprises an indication that a network is prepared for multipath transmission control protocol (MPTCP) use, where the node comprises a first packet data network (PDN) connection; and based, at least partially, upon reception by the node of the indication, transmitting from the node a request for a second packet data network (PDN) as indicated by block 114.

The network may receive the request and, based at least partially upon transmission of the indication to the node, implicitly treats the request as a request for a duplicate PDN connection for MPTCP use.

Any combination of one or more computer readable medium(s) may be utilized as the memory. The computer readable medium may be a computer readable signal medium or a non-transitory computer readable storage medium. A non-transitory computer readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In one example, the network may inform the UE about the selected gateway. However, this is not required. The network may select the gateway and then make the network transport tunnels, so that they appropriately terminate to the selected gateway. To the OE, the network may just signal success and other things described above such as the IP address configuration for example. For an example case where the UE selects the WLAN network, it is possible that the gateway becomes readily selected this way (by the UE). This is because the AP may be configured with a gateway, or if the IP configuration is received from a DHCP server, it may deliver the gateway address within the IP configuration.

An example method, apparatus, software or means may be configured to determine by a node if the node has a first packet data network (PDN) connection; and determine by the node whether a request for a second packet data network (PDN) connection is allowed based at least partially upon Access Network Discovery and Selection Function (ANDSF) type information. The method may further comprise sending the request with an explicit indication of a special type of connection for the second packet data network (PDN) connection. The method may further comprise, based on the ANDSF type information, sending the request without an explicit indication of a special type of connection for the second packet data network (PDN) connection in the request itself.

An example method, apparatus, software or means may be configured to determine if a node has a current first packet data network (PDN) connection, where the node is connected to an Access Point Name (APN) through the current first packet data network (PDN) connection; and connect the node to a second packet data network (PDN) connection, where the node is connected to the same Access Point Name (APN) through the second packet data network (PDN) connection.

An example method, apparatus, software or means may be configured to receive by a node a Management Object (MO), where the MO comprises an indication that a network is prepared for multipath transmission control protocol (MPTCP) use, where the node comprises a first packet data network (PDN) connection; and based, at least partially, upon reception by the node of the indication, transmit from the node a request for a second packet data network (PDN). The MO in the device may have been received from the configuration server such as ANDSF for example, but the device may have been pre-provisioned with the corresponding configuration data or Management Object. It may also be possible that such configuration is pre-provisioned in a Universal Integrated Circuit Card (UICC) (i.e. a smartcard also hosting a Universal Subscriber Identity Module (USIM) application). Thus, the Management Object (MO) may be received from a server, such as from a configuration server such as ANDSF for example, or the MO (or other corresponding configuration data, policy or management structure) may be pre-provisioned to the device or provisioned to the smartcard or a module hosting a subscriber identity application. Whatever the exact mechanism(s) of provisioning, the method, apparatus, software or means may be configured to receive may comprise any means of making a device aware of MPTCP related policies; among other such definitions.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
  establishing, by a user equipment, a first connection with a packet data network via a first access network, the user equipment being assigned a first Internet protocol address for the first connection;
  transmitting, to the packet data network, a request to establish a second connection with the packet data network via a second access network, the request including an indication that the request is associated with a multipath transmission control protocol in order to obtain a second Internet protocol address for establishing the second connection, the second Internet protocol address being different from the first Internet protocol address; and
  establishing, based at least on the second Internet protocol address, the second connection with the packet data network via the second access network.

2. The method as in claim 1, wherein the request to establish the second connection is sent subsequent to having established the first connection via a network access point to the packet data network, wherein the second connection is established via a same network access point to the packet data network, and wherein the network access point is identified based at least on an Access Point Name.

3. The method as in claim 2, further comprising:
  receiving, from the packet data network, a message indicating an allowance of the request to establish the second connection to the packet data network through the same network access point as the first connection to the packet data network.

4. The method as in claim 1, wherein the request to establish the second connection is sent subsequent to having established the first connection via a first network access point to the packet data network, wherein the second connection is established via a second network access point to the packet data network, and wherein the first network access point and the second network access point are identified by different access point names.

5. The method as in claim 1, wherein the request to establish the second connection is sent subsequent to having established the first connection via a gateway to the packet data network, and wherein the second connection is established via a same and/or a different gateway to the packet data network.

6. The method as in claim 1, further comprising:
  receiving, from the packet data network, an Internet protocol address configuration for the first connection and/or the second connection.

7. The method as in claim 1, further comprising:
  receiving, from the packet data network, the first Internet protocol address and the second Internet protocol address.

8. The method as in claim 7, wherein the second Internet protocol address is received in response to the request to establish the second connection.

9. An apparatus comprising:
  at least one processor; and
  at least one non-transitory memory including computer program code, which when executed by the at least one processor, cause the apparatus to at least:
    establish a first connection with a packet data network via a first access network, the apparatus being assigned a first Internet protocol address for the first connection;
    transmit, to the packet data network, a request to establish a second connection with the packet data network (PDN) via a second access network, the request including an indication that the request is associated with a multipath transmission control protocol in order to obtain a second Internet protocol address for establishing the second connection, the second Internet protocol address being different from the first Internet protocol address; and
    establish, based at least on the second Internet protocol address, the second connection with the packet data network via the second access network.

10. The apparatus as in claim 9, wherein the request to establish the second connection is sent subsequent to having established the first connection via a network access point to the packet data network, and wherein the second connection is established via a same and/or a different network access point to the packet data network.

11. The apparatus as in claim 9, wherein the request to establish the second connection is sent subsequent to having established the first connection via a gateway to the packet data network, and wherein the second connection is established via a same and/or a different gateway to the packet data network.

12. An apparatus comprising:
  at least one processor; and
  at least one non-transitory memory including computer program code, which when executed by the at least one processor, cause the apparatus to at least:
    determine that a user equipment has established a first connection with a packet data network via a first access network, the user equipment being assigned a first Internet protocol address for the first connection;
    receive, from the user equipment, a request to establish a second connection with the packet data network via a second access network, the request including an indication that the request is associated with a multipath transmission control protocol; and
    in response to the request, transmit, to the user equipment, a second Internet protocol address to at least enable the user equipment to establish, based at least on the second Internet protocol address, the second connection with the packet data network via the second access network, the second Internet protocol address being different from the first Internet protocol address.

13. The apparatus as in claim 12, where the apparatus is further caused to at least:
deny another request to establish the second connection, the other request being denied based at least on the other request not including an indication that the other request is associated with the multipath transmission control protocol.

14. The apparatus as in claim 12, wherein the request to establish the second connection is received subsequent to the establishment of the first connection via a network access point to the packet data network, and wherein the second connection is established via a same and/or a different network access point to the packet data network.

15. The apparatus as in claim 12, wherein the request to establish the second connection is received subsequent to the establishment of the first connection via a gateway to the packet data network, and wherein the second connection is established via a same and/or a different gateway to the packet data network.

* * * * *